(12) United States Patent
Coulson

(10) Patent No.: US 7,856,063 B2
(45) Date of Patent: Dec. 21, 2010

(54) NARROWBAND INTERFERENCE SUPPRESSION FOR OFDM SYSTEMS

(75) Inventor: Alan James Coulson, Lower Hutt (NZ)

(73) Assignee: Industrial Research Limited, Auckland (NZ)

( * ) Notice: Subject to any disclaimer, the term of this patent is extended or adjusted under 35 U.S.C. 154(b) by 1248 days.

(21) Appl. No.: 10/561,702

(22) PCT Filed: Jun. 25, 2004

(86) PCT No.: PCT/NZ2004/000134

§ 371 (c)(1),
(2), (4) Date: May 22, 2006

(87) PCT Pub. No.: WO2004/114617

PCT Pub. Date: Dec. 29, 2004

(65) Prior Publication Data

US 2007/0009011 A1 Jan. 11, 2007

(30) Foreign Application Priority Data

Jun. 25, 2003 (NZ) .................................. 526669

(51) Int. Cl.
*H04K 1/10* (2006.01)
*H04B 1/10* (2006.01)

(52) U.S. Cl. ..................................... 375/260; 375/346

(58) Field of Classification Search ................ 375/144, 375/148, 260, 285, 346, 270, 321; 370/208, 370/210

See application file for complete search history.

(56) References Cited

U.S. PATENT DOCUMENTS

| 6,426,983 | B1 | 7/2002 | Rakib et al. | |
|---|---|---|---|---|
| 6,473,453 | B1 | 10/2002 | Wilkinson | |
| 6,757,241 | B1 | 6/2004 | Jones et al. | |
| 2003/0002471 | A1* | 1/2003 | Crawford et al. | 370/343 |
| 2003/0031275 | A1* | 2/2003 | Min et al. | 375/326 |
| 2003/0054755 | A1* | 3/2003 | Zehavi et al. | 455/1 |
| 2003/0235254 | A1 | 12/2003 | Fanson et al. | |

FOREIGN PATENT DOCUMENTS

| EP | 0 126 179 | 11/1984 |
|---|---|---|
| EP | 1 176 731 | 1/2002 |
| EP | 1 202 468 | 5/2002 |
| WO | WO 02/23781 | 3/2002 |
| WO | WO 02/069515 | 9/2002 |

(Continued)

OTHER PUBLICATIONS

M.G. Amin et al., "Optimum Interference Excision in Spread Spectrum Communications Using Open-Loop Adaptive Filters," IEEE, Jul. 1999.

(Continued)

*Primary Examiner*—Young T. Tse
(74) *Attorney, Agent, or Firm*—Dann, Dorfman, Herrell and Skillman, P.C.

(57) ABSTRACT

A method for suppressing narrowband interference in OFDM receivers is provided including the steps of acquiring a sample of received data, estimating parameters of each of a number of narrowband interferers from the acquired sample of data, forming an excision filter using the estimated parameters and inserting the excision filter into an OFDM receiver.

19 Claims, 11 Drawing Sheets

FOREIGN PATENT DOCUMENTS

| | | |
|---|---|---|
| WO | WO 02/101953 | 12/2002 |
| WO | WO 03/090422 | 10/2003 |

OTHER PUBLICATIONS

R. Nilsson et al., "A Narrow-Band Interference Canceller for OFDM-based Systems," 4th Euro. Personal Mobile Comm. Conf., Feb. 2001.

G.J. Saulnier et al., "Performance of a Spread Spectrum OFDM System in a Dispersive Fading Channel with Interference," IEEE, Oct. 1998.

J.A. Young et al., "Performance Metrics for Windows Used in Real-Time DFT-Based Multiple-Tone Frequency Excision," IEEE, Mar. 1999.

S. Kapoor et al., "Interference Suppression in DMT Receivers Using Windowing," IEEE, Jun. 2000.

L.B. Milstein et al., "An Analysis of a Real-Time Transform Domain Filtering Digital Communication System—Part I: Narrow-Band Interference Rejection," IEEE, Jun. 1980.

S.D. Sandberg, "Adapted Demodulation for Spread-Spectrum Receivers which Employ Transform-Domain Interference Excision," IEEE, Sep. 1995.

G. Carron et al., "Comparison of Two Modulcation Techniques Using Frequency Domain Processing for In-House Networks," IEEE, Feb. 2001.

K. Witrisal, "Impact of DC-offsets and Carrier Feed-through on Correlation-based Frequency Synchronization for OFDM," 6th Intl. OFDM-Workshop 2001.

D. Gerakoulis et al., "An Interference Suppressing OFDM System for Wrieless Communications," IEEE, Apr. 2002.

M. Kuhn et al., "Linear block codes for frequency selective PLC channels with colored noise and multiple narrowband interference," IEEE, 2002.

R.W. Lowdermilk et al., "Interference Mitigation in Orthogonal Frequency Division Multiplexing (OFDM)," IEEE, Sep. 1996.

S.J. Howard, "Narrowband Interference Rejection Using Small FFT Block Sizes," IEEE, Oct. 1992.

J.G. Proakis, "Intererence Suppression in Spread Spectrum systems," IEEE Sep. 1996.

H-F Hsiao, "Narrow-Band Interference Rejection in OFDM-CDMA Transmission System," IEEE, 1998.

* cited by examiner

NARROWBAND INTERFERENCE SUPPRESSION FOR OFDM SYSTEMS

FIELD OF INVENTION

The invention relates to narrowband interference suppression systems for OFDM communications system and in particular to excision filtering for narrowband interference suppression system for OFDM communication systems.

BACKGROUND

Orthogonal frequency division multiplexing (OFDM) has become the physical layer of choice for many wireless communications systems. An attractive feature of current wireless local area network (WLAN) and wireless metropolitan area network (WMAN) standards based on OFDM is the designed ability to operate in unlicensed spectrum. However, these systems must share spectrum with other unlicensed systems; such as cordless telephones, garage door openers, baby monitors and microwave ovens; which produce narrowband interference in WLAN and WMAN systems. Further, radio non-idealities such as transmitter carrier feedthrough (also known as carrier leakage) also introduce narrowband interference in the form of single-frequency carrier residues.

Pilot symbol assisted systems are particularly susceptible to narrowband interference during receiver detection and synchronisation. Pilot symbol assisted systems are also susceptible to narrowband interference on the data transport phase of receiver operation. An interference suppression technique has been proposed to improve the performance of pilot symbol assisted detection and synchronisation in the presence of narrowband interference, see PCT/NZ2004/000060. However, this technique cannot be applied during data transport as it introduces inter-symbol interference.

Previous proposed interference suppression systems for OFDM include using pre-coding, spread spectrum OFDM, and post-detection receiver techniques involving equalizers. There are many literature reports on narrowband interference suppression techniques for spread spectrum systems, including excision-based methods. However the interference suppression requirements for OFDM differ significantly from the requirements for spread spectrum.

Previously proposed methods for narrowband interference suppression include using pre-coding and spread spectrum techniques. These methods require modifications to the transmitted OFDM signal which are not supported by current OFDM standards. Frequency domain techniques also have been proposed, but these either do not take account of spectral leakage from the interference, or require substantial processing to estimate and remove the interference from all OFDM frequency bins. Additionally, another proposed method requires co-operation of the transmitter in not sending data on a number of sub-carriers in the vicinity of (that is, close to in frequency) each narrowband interferer. Again, this ability to modify the transmitted signal is not supported by the current standards.

SUMMARY OF INVENTION

It is the object of the present invention to provide an improved system and method for interference suppression in OFDM communications systems or to at least provide the public with a useful choice.

In broad terms in one aspect the invention comprises a method for suppressing narrowband interference in OFDM receivers including the steps of acquiring a sample of received data, estimating parameters of each of a number of narrowband interferers from the acquired sample of data, forming an excision filter using the estimated parameters and inserting the excision filter into an OFDM receiver.

Preferably the filter is inserted into the OFDM receiver prior to a discrete Fourier transform.

Preferably the estimated parameters of the narrowband interferers include demodulated carrier frequency, magnitude and phase.

Preferably the step of estimating the number of narrowband interferers includes the steps of performing a forward DFT on the samples, and performing a periodogram search on the output of the DFT to identify peaks in the periodogram where the number of peaks in the periodogram corresponds to the number of interferers.

Preferably the step of estimating parameters of the narrowband interferers includes estimating the location of an interferer as the frequency of a peak on the corresponding periodogram, estimating the magnitude of the interferer as the amplitude of the corresponding periodogram peak, and estimating the phase of the interferer as the phase of the corresponding periodogram peak.

Preferably the narrowband interferer parameter estimates of each narrowband interferer are used to initialise a digital phase lock loop.

Preferably the method for suppression narrowband interference includes the step of receiving an indication of a start of packet when a data packet is received by the OFDM receiver.

Preferably the phase lock loops are updated with each incoming sample until either a counter expires or an OFDM packet is detected. The phase lock loops are used to estimate the carrier frequency of the narrowband interferers. Preferably the phase lock loops are digital phase lock loops. Preferably one phase lock loop is used for each interferer.

Preferably the current narrowband interferer carrier frequency estimates from the phase lock loops that have achieved "lock" are used to initialise an excision filter when an OFDM packet is detected.

The excision filter may have impulse response duration less than the OFDM guard interval.

In broad terms in a further aspect the invention comprises an OFDM receiver including a front end arranged to receive data, a data sampler arranged to provide samples of received data, a narrowband interference detector that detects narrowband interferers in the sample of received data and estimates parameters of each narrowband interferer, and an excision filter that uses the estimated parameters of each narrowband interferer to reduce noise from the narrowband interferers.

Preferably the excision filter is inserted into the OFDM receiver prior to a Fourier transform operator.

Preferably the narrowband interference detector estimates the demodulated carrier frequency, magnitude and phase of the narrowband interferers.

Preferably the narrowband interference detector includes a Fourier transform operator arranged to perform a Fourier transform on the samples and perform a periodogram search on the output of the Fourier transform operator to identify peaks in the periodogram and at least one phase lock loop arranged to lock onto a peak identified by the periodogram search.

Preferably the narrowband interference detector is further arranged to estimate the frequency of an interferer as the location of a peak on the corresponding periodogram, estimate the magnitude of the interferer as the amplitude of the corresponding periodogram peak, and estimate the phase of the interferer as the phase of the corresponding periodogram peak.

Preferably the narrowband interference detector includes a timer and a filter design module.

Preferably the OFDM receiver is further arranged to provide an estimate of the start of an OFDM data packet to the narrowband interference detector.

Preferably the narrowband interference detector is arranged to innovate the phase lock loop(s) until either the timer times out or an OFDM packet is received.

Preferably the phase lock loops are arranged to estimate the carrier frequency of the narrowband interferers.

Preferably one phase lock loop is used for each interferer.

Preferably the current narrowband interferer carrier frequency estimates from the phase lock loops that have achieved "lock" are used by the filter estimator to initialise an excision filter when an OFDM packet is detected.

The excision filter may have impulse response duration less than the OFDM guard interval.

BRIEF DESCRIPTION OF DRAWINGS

The invention will be further described by way of example only and without intending to be limiting with reference to the following drawings, wherein.

DETAILED DESCRIPTION

Figure 1A:
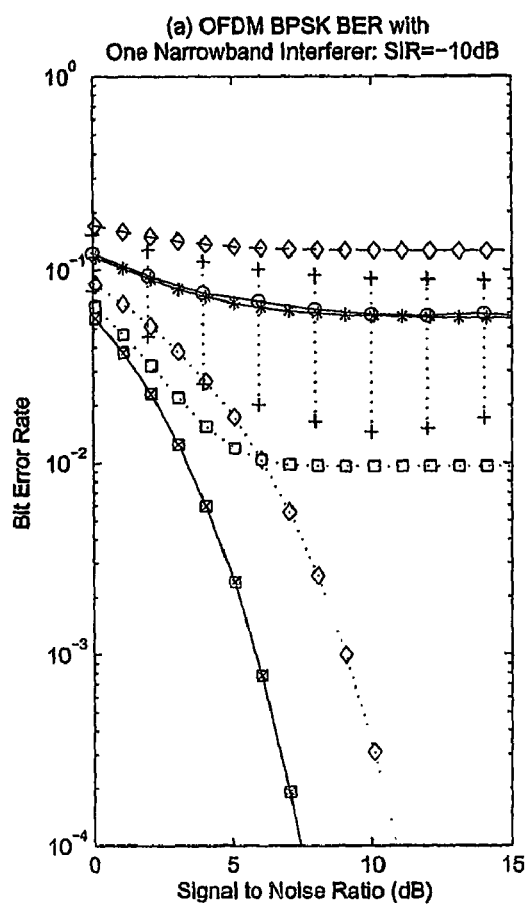
FIG. 1A shows the bit error rate performance of BPSK modulated OFDM with a single interferer and signal to interference ratio (SIR) of −10 dB.

A common model for a received, baseband (low pass equivalent) OFDM symbol, sampled with period T, is $$r_n = c(\tau;nT) \otimes s(nT-\tau_s)e^{-j[2\pi\nu(nT-\tau_s)+\theta]} + \eta(nT) \quad (1)$$

where $c(\tau;nT)$ is a doubly dispersive, low pass equivalent, fading channel which introduces time-dispersion in dimension $\tau$, $s(t)$ is the transmitted signal, n is the sample index, $\tau_s$, $\nu$ and $\theta$ are, respectively, the time-, frequency- and phase-offsets between transmitter and receiver introduced by a combination of system non-idealities and channel linear distortions, and $\eta$ is complex additive white Gaussian noise (AWGN) having variance $\sigma_w^2$ and $\otimes$ is the convolution operator. Addition to N narrowband interferes to the received signal produces $$r_n = c(\tau;nT) \otimes s(nT-\tau_s)e^{-j[2\pi\nu(nT-\tau_s)+\theta]} + \quad (2)$$
$$c(\tau;nT) \otimes \sum_{i=1}^{N} b_i e^{-j[2\pi\xi_i nT+\phi_i]} + \eta(nT)$$

where $b_i$, $\xi_i$ and $\phi_i$ are, respectively, the amplitude, frequency and phase of the ith of N demodulated narrowband interferer.

This simple interference model is realistic for narrowband FM (eg cordless telephones, baby monitors), for low rate digital modulators (eg garage door openers), and for carrier feedthrough. For other interferers of greater bandwidth (eg microwave ovens and Bluetooth devices), more complex models than equation (2) may be required. Carrier feedthrough in the transmitter produces an in-band interferer at a frequency equal to the frequency difference between transmitter and receiver local oscillators which, depending on the amount of Doppler shift, will be equal or close to the frequency offset, v. Typically, the maximum carrier frequency offset is much less than the OFDM sub-carrier spacing and the pilot symbol is designed specifically to be able to resolve this frequency without ambiguity. Any DC offset will occur at narrowband interference frequency, $\xi=0$ and interference from other users of license-free spectrum may occur either singly (e.g. garage door openers, baby monitors, microwave ovens) or in pairs (e.g. cordless telephones) at any in-band frequency. It is noted that, at the time of writing, anecdotal evidence suggests a much higher likelihood of interference in the 2.4 GHz ISM band than in the 5 GHz band. This suggests that the principal immediate application of the invention maybe to IEEE 802.11 g-compliant WLANs.

Each narrowband interferer will experience only frequency flat multipath fading, so the effect of the fading channel on the narrowband interferers may be incorporated by modifying the random amplitude and phase of each. Further, assuming that the cyclic prefix of each OFDM block has been chosen to be sufficiently long so as to prevent inter-symbol interference, then the effect of the fading channel on the OFDM signal may be treated as being purely multiplicative on a per block basis. Since the focus of this invention on bit errors produced by narrowband interference, the multiplicative effect of the fading channel on each OFDM signal sub-carrier is neglected and frequency flat fading also is assumed to apply to the OFDM signal. Moreover, as the primary concern here is with packet-based systems where the maximum packet duration is very much shorter than the typical operating channel coherence time, the effect of time variation in the channel also may neglected. Where the validity of each of these assumptions becomes important, this is commented on at appropriate points below. It is assumed also that packet detection and synchronisation have been achieved. Thus, ideal, uncoded systems which are perfectly synchronised are considered: practical system performance is dependent on the specific detection, synchronisation and coding/decoding algorithms employed—these are not within the scope of this paper. Incorporation of these assumptions simplifies the model to $$r_n = as_n + \sum_{i=1}^{N} b_i e^{-j[2\pi \xi_i nT + \phi_i]} + \eta_n, \quad (3)$$

where a is the static Gaussian channel attenuation.

At the transmitter, an OFDM symbol is produced such that $$s_n = w_n \sum_{k=0}^{L-1} d_k e^{j2\pi n \frac{k}{L}}, \quad (4)$$

is the nth of L samples in the OFDM symbol, where $d_k$ is the kth data symbol from some modulation constellation (for example, m-PSK or m-QAM), and $w_n$ is a windowing function which is often simply rectangular ($w_n=1$, $\forall n$). Typically, a K member subset of $\{d_k\}$ is set to zero as spectral blanking, thus L time domain samples represent L-K frequency domain symbols.

At the receiver, the L-point inverse discrete Fourier transform (DFT) of the narrowband interferer has the kth sample $$I_k = \sum_{n=0}^{L-1} b e^{-j[2\pi \xi nT + \phi]} e^{-j2\pi k \frac{n}{L}} \quad (5)$$

$$= b\Psi_k(\xi, \phi),$$

where $$\Psi_k(\xi, \phi) = e^{-j\left[\pi(L-1)\left(\frac{k}{L} - \xi T\right) + \phi\right]} \frac{\sin \pi L\left(\frac{k}{L} - \xi T\right)}{\sin \pi \left(\frac{k}{L} - \xi T\right)} \quad (6)$$

is the sampled circular sinc function centred at the interferer frequency. Where the interferer frequency does not coincide exactly with a DFT frequency sample (that is, where $\xi T \neq k/L, k \in \{0 \ldots L-1\}$) then $|I_k|>0$, $\forall k$, which is known as spectral leakage. Thus, the amount of interference experienced by each data symbol depends on the particular value of the interferer frequency.

For single interferers having particular values of received amplitude b, normalised carrier frequency $\xi T$ and phase $\phi$ of the (receiver) mean BER in the $k^{th}$ BPSK modulated OFDM data bin is given by the conditional distribution $$p_e(\gamma_b, \gamma_i \mid k, \xi, \phi) = \left[\frac{1}{4}\text{erfc}\left(\sqrt{\gamma_b} + \sqrt{\gamma_i}\,\text{Re}\{\Psi_k(\xi, \phi)\}\right) + \right. \quad (7)$$
$$\left. \frac{1}{4}\text{erfc}\left(\sqrt{\gamma_b} - \sqrt{\gamma_i}\,\text{Re}\{\Psi_k(\xi, \phi)\}\right)\right]$$

where $\gamma_b = Ad^2/\sigma_W^2$ is the mean SNR per bit for (mean) BPSK bit energy $d^2$, $\gamma_i = b^2/\sigma_W^2$ is the mean INR per sample, and $\sigma_W^2$ is the noise power per bit. Note that A and $\sigma_W^2$ are frequency domain duals of the time domain quantities a and $\sigma_w^2$ expressed in equations (1) and (3). This expression is derived from geometric considerations noting that the summation of two complementary error functions averages the BER for two possible values of the BPSK data bit.

Figure 1B:
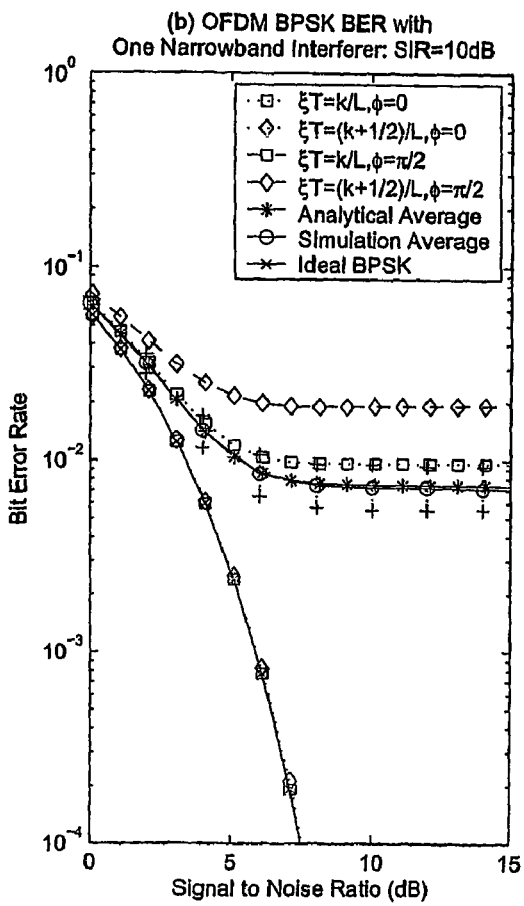
FIG. 1B shows the bit error rate performance of BPSK modulated OFDM with a single interferer and SIR of 10 dB.

The mean BER across each BPSK modulated OFDM symbol for a single interferer having particular values of $\xi T$ and $\phi$ is obtained by averaging across all data bins, thus $$p_e(\gamma_b, \gamma_i \mid \xi, \phi) = \frac{1}{L-K} \sum_{k=0}^{L-K-1} p_e(\gamma_b, \gamma_i \mid k, \xi, \phi), \quad (8)$$

noting that only L-K data bins in the OFDM symbol carry data. Note also that the effect of frequency-selective fading additionally can be accounted for in equation (8) by replacing frequency flat A with $A_k$, the channel gain per frequency bin. Insertion of particular values of interferer frequency, $\xi T$, and interferer phase, $\phi$, into equation (8) demonstrates there is considerable variation in mean BER per OFDM symbol across the ensemble of $\xi T$ and $\phi$. Thus, for a given interferer, the particular values of interferer phase, $\xi T$, and interferer phase, $\phi$, largely determine the BER for an individual received packet. This is illustrated in FIGS. 1A and 1B, which show analytical bit error rates for particular values of $\xi T$ and $\phi$, as well as for the ensemble average (both analytical and simulation) and for interference-free (ideal) BPSK modulated OFDM.

The ensemble average BER for BPSK modulated OFDM in the presence of a single narrowband interferer can be found by integrating equation (8) over the ensemble of $\xi T$ and $\phi$, producing $$p_e(\gamma_b, \gamma_i) = \int_k \int_\xi \int_\phi p_e(\gamma_b, \gamma_i \mid k, \xi, \phi) p_k(k) p_\xi(\xi) p_\phi(\phi) d\phi d\xi dk \quad (9)$$

$$= \frac{1}{L-K} \sum_{k=0}^{L-K-1} \frac{1}{2\pi} \int_{-\pi}^{\pi} T \int_0^{\frac{1}{T}} p_e(\gamma_b, \gamma_i \mid k, \xi, \phi) d\phi d\xi.$$

Expressions similar to equation (9) have been developed previously for evaluating the BER of direct sequence spread spectrum (DSSS) suffering narrowband interference. The principal difference is that the previously developed expressions average SNR and INR across frequency within the error function, whereas equation (9) averages SNR and INR across frequency outside the error function. This highlights that BER for DSSS depends on average narrowband interference power, thus is insensitive to particular values of interferer carrier frequency and phase, and so any techniques that reduce average SIR will improve BER performance. By contrast, BER for OFDM depends on interference power per DFT bin, thus is sensitive to particular values of interferer carrier frequency and phase, and the DFT itself increases BER by introducing interference to more data-bearing carriers through spectral leakage. This is illustrated in FIGS. 1A and 1B which compare the ensemble average BERs of OFDM and DSSS for a single narrowband interferer. Note that the SNR and signal-to-interference ratio (SIR) are both expressed as average per sample quantities in FIGS. 1A and 1B.

As can be seen from these Figures the bit error rates are highest for the interferer where the interferer frequency, $\xi T$, is not equal to the DFT frequency sample, K/L, and the phase of the interferer is $\pi/2$. It should be noted that the legend in FIG. 1B applies also to FIG. 1A. These figures show close agreement of ensemble averages produced analytically and by computer simulation. Note also the variation within the ensemble, indicated both by analytical BER curves for particular values within the ensemble and by the $10^{th}$ and $90^{th}$ percentile limits on the computer simulation BER curves (shown as error bars).

Of particular importance in FIGS. 1A and 1B is the behaviour of the ensemble average BER of BPSK modulated OFDM in the presence of a single narrowband interferer. FIG. 1A shows that, for an SIR of −10 dB, the mean BER asymptotes at about 0.06 at which level even the heaviest coding/decoding may fail to produce an error-free packet. Note that, for SNRs of greater than 10 dB, the mean BER is independent of SNR. FIG. 1B shows that, even for a modest SIR of 10 dB, the mean BER asymptotes at about 0.008, requiring heavy coding/decoding to produce error free packets.

For multiple narrowband interferers, the mean BPSK modulated BER in the kth OFDM data bin can be obtained by modifying equation (7) to produce $$p_e(\gamma_b, \gamma_1 \ldots \gamma_N | k, \xi, \phi) = \left[\frac{1}{4}\text{erfc}\left(\sqrt{\gamma_b} + \sum_{i=1}^{N}\sqrt{\gamma_i}\,\text{Re}\{\Psi_k(\xi_i, \phi_i)\}\right) + \frac{1}{4}\text{erfc}\left(\sqrt{\gamma_b} - \sum_{i=1}^{N}\sqrt{\gamma_i}\,\text{Re}\{\Psi_k(\xi_i, \phi_i)\}\right)\right] \quad (10)$$

where $\gamma_i = b_i^2/\sigma_W^2$ here is the mean INR per sample for the ith interferer. Respective average BER expressions for multiple interferers can be obtained by inserting equation (10) into equation (8) and (9) as required.

Excision-based methods of interference cancellation require estimation of the carrier frequency only (but not amplitude or phase) for each narrowband interferer. For an excision filter having a frequency response H(f), the post-excision conditional BER for BPSK modulated OFDM is produced by modifying equation (7) to obtain $$p_e(\gamma_b, \gamma_i | k, \xi, \phi) = \left[\frac{1}{4}\text{erfc}\left(\sqrt{\gamma_b} + \frac{H(\xi)}{H\left(\frac{k}{T}\right)}\sqrt{\gamma_i}\,\text{Re}\{\Psi_k(\xi, \phi)\}\right) + \right. \quad (11)$$

$$\left. \frac{1}{4}\text{erfc}\left(\sqrt{\gamma_b} - \frac{H(\xi)}{H\left(\frac{k}{T}\right)}\sqrt{\gamma_i}\,\text{Re}\{\Psi_k(\xi, \phi)\}\right)\right],$$

which may be inserted into equation (9) to produce the marginal distribution representing the ensemble BER. Each OFDM sub-channel for which the frequency response of the OFDM data is greater than the frequency response of the narrowband interferer, $$H\left(\frac{k}{T}\right) > H(\xi),$$

will experience an improved BER compared to the unfiltered equivalent. In particular when the frequency response of the narrowband filter is zero, $H(\xi)=0$, equation (11) reduces to the ideal BER for BPSK noting that, due to finite precision in any practical digital implementation this condition is seldom met. Note that equation (11) is valid only for excision filters having impulse response duration less than the OFDM guard interval. Where this is not the case, the excision filter will introduce some degree of inter-symbol interference.

The main challenges for excision filtering are, firstly, estimation of the interferer carrier frequency (such that the notch of the excision filter is correctly positioned in frequency) and, secondly, design and implementation of an effective and efficient notch filter. To account explicitly for the effect of carrier frequency estimation error on equation (11), the frequency response of the narrowband interferer, $H(\xi)$, can be replaced with $H(\xi|\epsilon_\xi)$, the excision filter frequency response at the true interferer frequency conditioned on the filter having been designed to excise the estimated interferer frequency, where $\epsilon_\xi = \xi - \hat{\xi}$ is the particular value of estimation error and $\hat{\xi}$ is the estimated frequency of the narrowband interferer. The marginal distribution of equation (9) must then be integrated additionally over the estimation error distribution $p_\epsilon(\epsilon_\xi)d\epsilon_\xi$ to obtain the ensemble average BER. Note that excision filtering does not require the estimation of interferer power, so any time-variation introduced by the fading channel will not reduce the efficacy of excision filtering. Also, provided that the filter notch width is sufficient, excision filtering is insensitive to some time variation in interferer frequency, due to either modulation of the interferer or time variation in the channel.

Figure 2A:
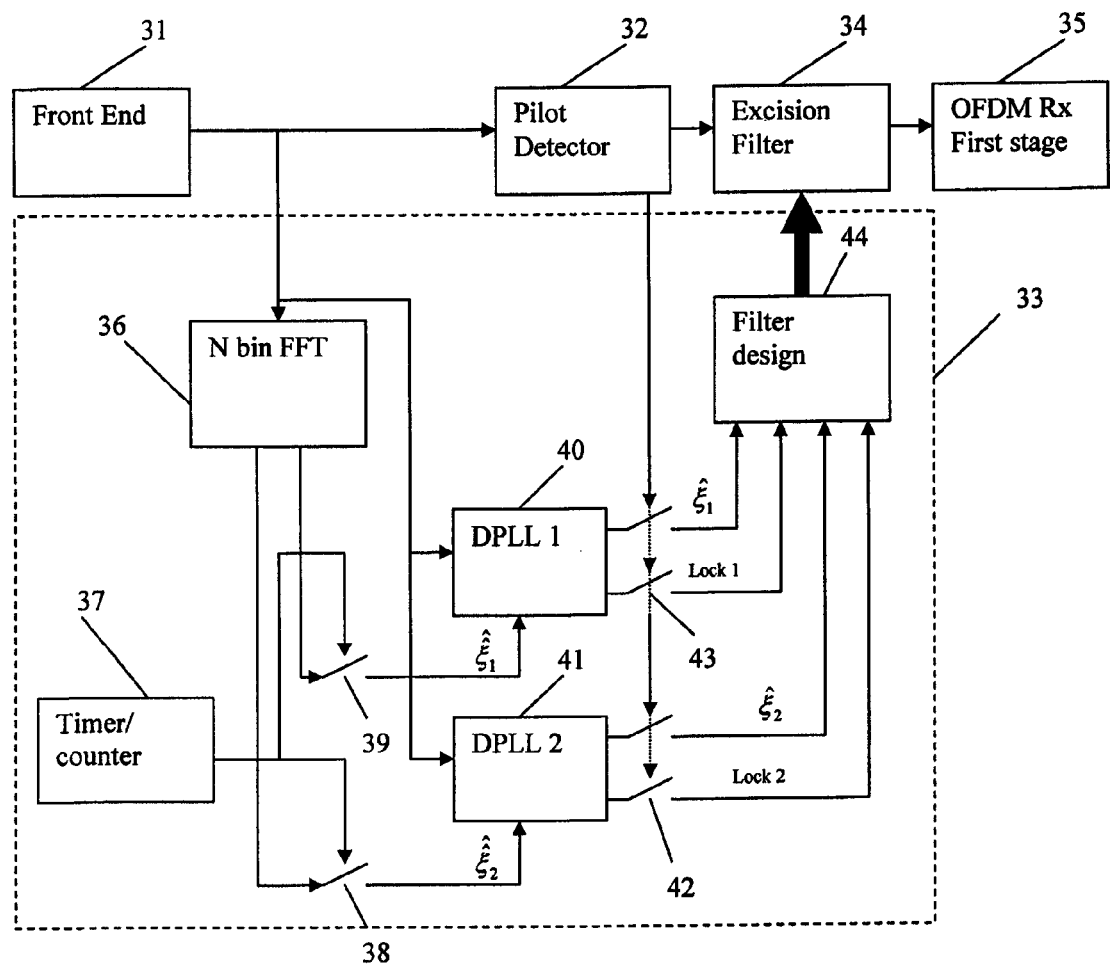
FIG. 2A is a block diagram of an interference suppression detector as part of an OFDM receiver in accordance with the present invention.
Figure 2B:
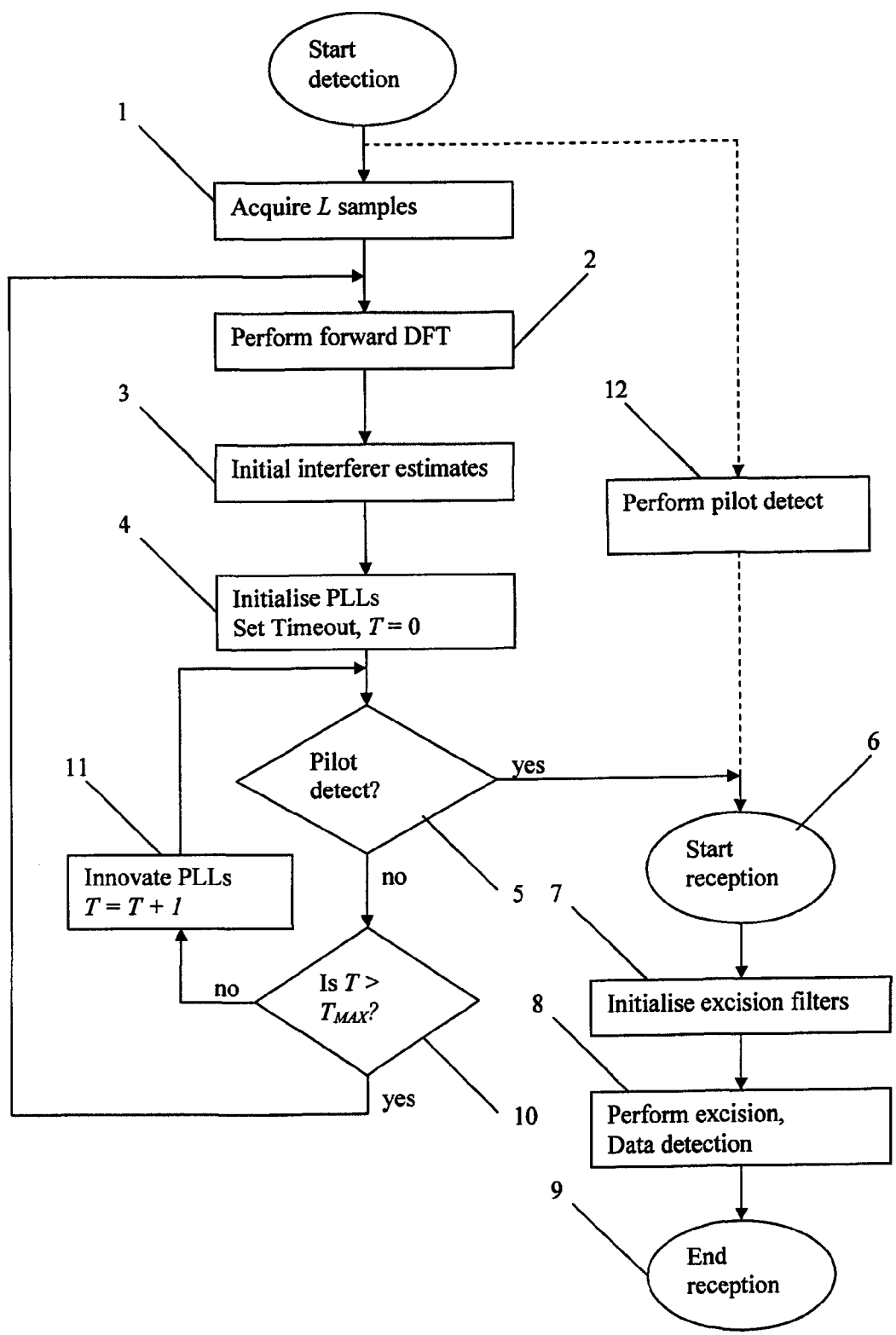
FIG. 2B is a flowchart showing one technique for interference suppression of the invention.

FIG. 2A is a block diagram of the interference suppression detector as part of an OFDM receiver according to the invention and FIG. 2B is a flow chart of the interference suppression technique of the invention. The narrowband interference suppression system can run in parallel with a technique for interference suppression during pilot symbol assisted detection and synchronisation such as that described in the applicant's patent application PCTINZ2004/000060 which is herein incorporated by reference. The multiple narrowband interference suppression system of the invention relies on estimating interference carrier frequency(s) during the signal-free period between data packets—this reduces the impact of the particular values of SIR and interferer carrier frequency on the algorithm performance. The estimated carrier frequencies are used to specify the excision filter applied to the received signal after detection. The multiple narrowband interference suppression system of the invention is particularly suited for interference suppression during the data transport phase of the data reception. However this technique can also be used during packet detection and synchronisation.

FIG. 2B shows the steps of one embodiment of the excision-based narrowband interference suppression technique. When detection is started in step 1 an initial block of L samples of interference plus noise (no OFDM signal) is collected. The number of samples, L, is the block size of the available DFT software/firmware. In preferred embodiments L is typically the OFDM block size.

After the block of L is collected in step 2 maximum likelihood parameters estimates for the desired narrowband interferers are performed using the forward DFT on the block of L samples. After taking a DFT of the data block an assumption is made of the number of narrowband interferers present. Assuming that M interferers are anticipated as being present, then a periodogram search (which determined $\arg(\max([S_0 \ldots S_{L-1}]))$ for DFT output samples $(S_0 \ldots S_{L-1})$ is employed to identify the M largest periodogram peaks from the DFT output. To avoid false detection of interferers due to spectral leakage, periodogram bins either side of each identified peak are not considered in subsequent (recursive) searches. The assumption of the number of interferers present is based on the maximum number of interferers that could be present. For example, if interference is caused by a cordless telephone there could be two interferers present but it is less likely that more than two interferers will be present. There is a performance/complexity trade-off in the number of interferers estimated to be present. Estimating a high number of interferers will give better performance but will also increase the complexity of the system compared to estimating a lower number of interferers.

After the periodogram search has identified the amplitude and phase of each identified periodogram peak are the estimated interferer magnitude and phase, respectively as shown in step 3. The frequency corresponding to the peak periodogram location is the estimated interferer demodulated carrier frequency.

In step 4 the M parameter estimate vectors are used to initialise M digital phase locked loops (PLLs). At this point a time-out counter is set.

In step 5 the equation is asked whether a packet has been detected. In the embodiment pilot detection is performed by another function (shown as step 12). If no packet has been detected the 'no' arrow is followed from step 5 to step 10 if a has been detected the 'yes' arrow is follwed from step 5 to step 6 and packet reception commences.

In step 10 the question is asked has the time-out counter expired. The time-out counter is used to ensure that the interferer estimates are current. For example, if a new interferer appears after the block of L samples is taken in step 1 it will not be compensated for unless periodically the process repeats by using the latest block of L samples to estimate the narrowband interferer parameters. In this way the technique should track the M strongest narrowband interferers. If the time-out counter has not expired the 'no' arrow is followed to step 11. If the time-out counter has expired the 'yes' arrow is followed to step 2 and the latest block of L samples is used to estimate the narrowband interferers. This ensures that new interferers are identified as they appear. In this way, the invention should track the M strongest narrowband interferers.

When the 'no' arrow is followed to step 11 the M PLLs are innovated and the time-out counter is incremented. The arrow is then followed to step 5. In this way the M PLLs are innovated with each incoming sample until either an OFDM packet is detected by a parallel process or the time-out counter expires. Each PLL locks onto an interferer to provide the carrier frequency of the interferer. If a PLL lock is not achieved then it can be assumed that no interferer is present for that PLL. The number of locks achieved indicates the number of interferers present. For example if two PLLs are initialised and innovated and only one achieves a lock it can be assumed that only one interferer is present. When this occurs only one excision filter is produced as the second interferer (if present) is deemed to have negligible impact on the BER.

When a packet is detected the 'yes' arrow is followed from step 5 to step 6. If a packet has been detected, then the current M interferer parameter estimates are used to initialise the excision filter in step 7. Importantly, each PLL provides a lock indication (for example $I_{lock} = \text{Im}(\epsilon_{PLL})/\text{Re}(\epsilon_{PLL})$, where $\epsilon_{PLL} = r_n e^{j[2\pi \xi_n T + \phi]}$ is the PLL error for the received signal, noise and narrowband interference, $r_n$, defined by equation (3) with the transmitted signal $s_n = 0$, approaches zero when phase lock has been achieved) which allows a genuine interferer to be distinguished from thermal noise. Only interferers for which PLL lock is achieved are excised from the OFDM packet.

During data reception, interferers are removed using one or more excision (notch) filter(s) centred at the estimated interferer demodulated carrier frequency shown in step 8. This filter is inserted at the input to the OFDM digital receiver prior to the forward DFT to prevent spectral leakage.

FIG. 2A is a block diagram of the interference suppression detector as part of an OFDM receiver according to the invention. The interference suppression apparatus of the invention is shown in blocks 33 and 34 and is positioned between front end 31 and a first stage of the OFDM receiver 35. The make-up of the front end 31 and the first stage of the OFDM receiver 35 are described in more detail in FIG. 3. The narrowband interference detector includes an N bin FFT 36, a timer/counter 37, switches 38 and 39, digital phase lock loops 40 and 41, switches 42 and 43, filter design module 44, and excision filter 34.

The narrowband interference detector starts acquiring L samples before detection of an OFDM packet. This means that the samples provided to the narrowband interference detector are noise and interference only with no OFDM signal present. The samples are provided to the FFT operator 36 and also to the inputs of digital phase lock loops 40 and 41.

It should be noted that while only two digital phase lock loops are provided in the example shown in this Figure any number M phase lock loops may be provided to suppress the M strongest interferers. Two phase lock loops are shown in this Figure so only the two strongest narrowband interferers will be cancelled by the interference detector of this Figure. The N bin FFT operator 36 performs an FFT on the input samples and performs a search on the output of the transformed data to identify the M largest peaks from the output. The FFT operator estimates the frequency, amplitude and phase of the M largest peaks. Once the amplitude and phase of each of the peaks are estimated as the interferer amplitude and phase, this is provided to switches 38 and 39 from the output of the FFT operator 36.

The phase lock loops are initialised and when the timer is set switches 38 and 39 are closed to provide interferer estimates to phase lock loops 41 and 40 respectively. Phase lock loops 40 and 41 each lock on to an interferer and are continually innovated as new samples come in until either a pilot symbol is detected or the timer times out.

If the timer times out the latest L samples are acquired by the FFT operator 36 and the process begins again.

While the phase lock loops are operating a pilot symbol may be detected indicating the start of an OFDM packet.

When a pilot symbol is detected by pilot symbol detector 32 switches 42 and 43 are operational to provide a lock indication and further estimates of the interferer frequencies to filter design module 44. The filter design module then designs a filter for the excision filter 34 based on the estimated interferer frequencies 15 from the phase lock loops and also the lock indications. If a phase lock loop provides a "no lock" on the lock indication then the estimated interferer frequency from that phase lock loop will not be taken into account in the filter design. The excision filter is then designed as a notch filter to remove frequencies estimated as the interferer frequencies. Once the pilot symbol is detected samples proceed through the pilot detector 32 and then through excision filter 34 to the rest of the OFDM receiver 35.

FIG. 2A shows a block diagram of one embodiment of a narrowband interference suppression detector as part of an OFDM receiver according to the invention. It is possible from the narrowband interference detector in different ways 25 including using a DFT instead of FFT operator 36 providing a different number of phase lock loops. The particular implementation given here should not be seen as limiting to those skilled in the art.

Figure 3:
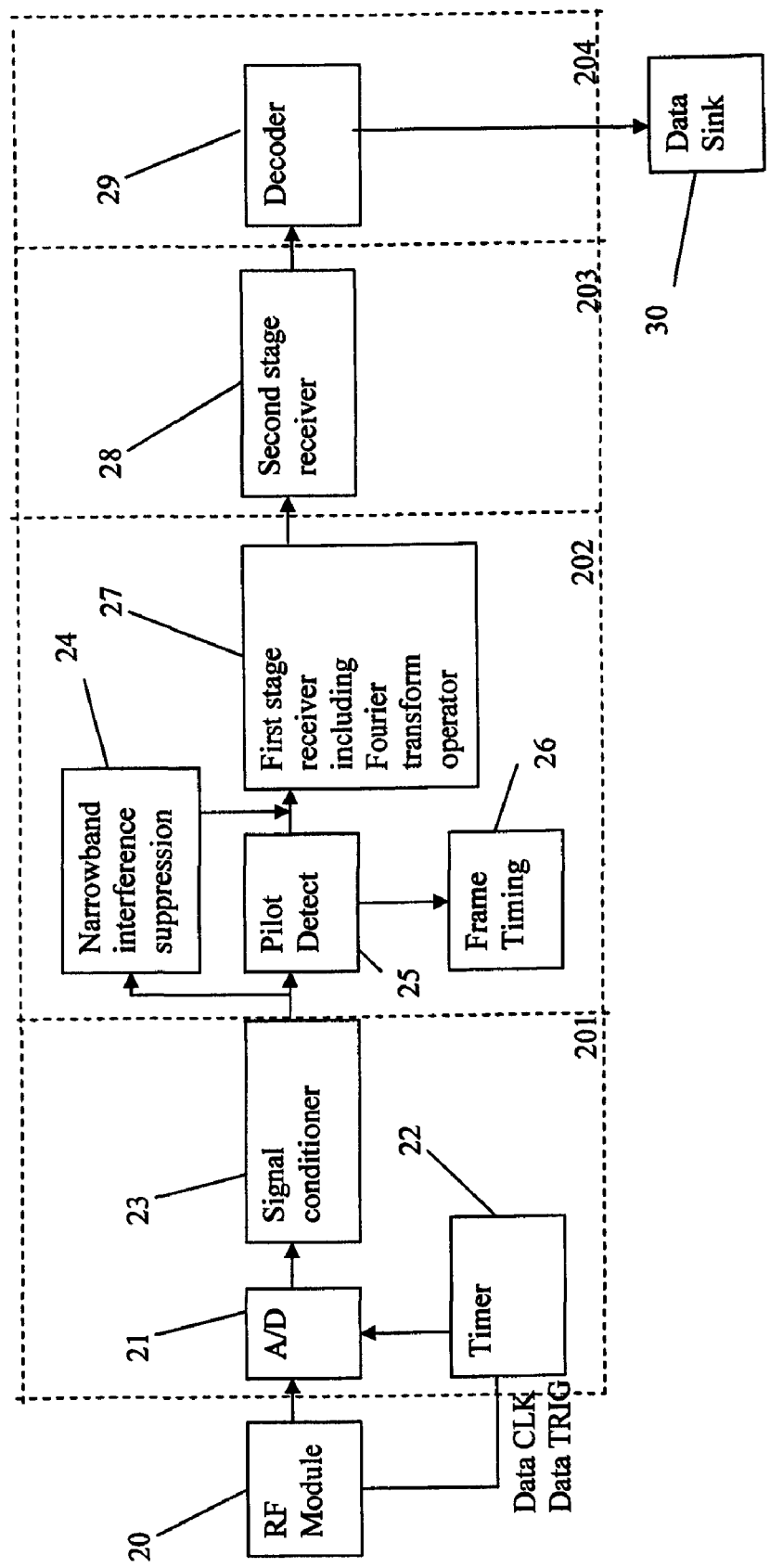
FIG. 3 is a block diagram of an OFDM receiver including the interference suppression system of the invention.

FIG. 3 shows an OFDM baseband receiver comprising four modules. Module 201 includes an A/D converter driver 21, timer 22 and signal conditioner 23; module 202 includes a pilot detector 25, frame timer 26, narrowband interference suppression module 24 and first stage receiver 27; module 203 includes a second stage receiver 28; and module 204 includes a decoder 23.

The data received by RF block 20 which is arranged to shift the data back to baseband. The RF block of the receiver may include a low noise amplifier, bandpass filter, quadrature demodulator and frequency down-converter. The baseband data is then sampled by analogue to digital (A/D) converter 21. This converts the received data from an analogue signal to digital samples. Ideally the A/D converter samples the received data at greater than the nominal bit rate. The sampled signal then passes through signal conditioner 23, that compensates for some of the channel and noise induced distortions. A further purpose of the signal conditioner 23 is to digitally low pass filter the baseband signal to remove out-of-band noise. The data may also be sampled to the nominal bit rate.

Pilot detector 25 and frame timing block 26 search for the start of a packet. Pilot detector 25 may also provide narrowband interference suppression when the packet is detected. Narrowband interference suppression block 24 applies narrowband interference suppression during the data transport phase of packet reception. In the preferred embodiment this block implements the algorithm of FIG. 2B.

Frame timing module 26 may be further arranged to provide a start of packet estimate to timer 22.

Once the start of a packet has been detected by pilot detect block 25 the packet is passed through first stage receiver 27. This receiver may estimate and compensate for frequency and phase errors in the received data. The first stage receiver also includes a Fourier transform operator that transforms the data from time domain data to frequency domain data. The advantage of applying the excision filter to OFDM in the time domain before the receiver FFT is to prevent spectral leakage from the narrowband interference occurring at all. This greatly simplifies the interference suppression requirements and improves the resulting BER performance.

The data is then passed into the second stage receiver 28. The second stage receiver commences operation on frame detection. The functions of the second stage receiver are, initially, to estimate the time varying sub-sample time offset and, throughout the remainder of the frame, to apply symbol timing error correction. The second stage receiver may also be used to update estimates of other time-varying parameters of the received data. The second stage receiver includes a data decision block that makes hard decisions on each data bit (symbol) prior to error detection and correction.

The second stage receiver may include a demodulator. Acting together with the decision process, the demodulator converts the data back from a modulation scheme, such as QPSK or 64 QAM, to binary data. After hard decisions have been made on the data the data streams are converted back from parallel to serial data.

Following the second stage receiver 28 is decoder 29. The decoder decodes the coded data and performs error corrections and/or detection up to the limit of the decoder. The decoder is matched to an encoder in the corresponding OFDM transmitter. For example if the encoder is a Reed-Solomon encoder then the decoder will be a Reed-Solomon decoder. Following decoding of the data the data is then passed to the electronic equipment attached to the receiver as data sink 30. The basic elements of an OFDM receiver are well known and will not be discussed in more detail.

At the completion of OFDM pilot detection, the receiver returns to its original state, described by step 1 of FIG. 2B in which new interferers are searched for prior to the reception of the next in-coming OFDM packet.

There are a number of design issues raised by the interference suppression technique, principally concerning the PLLs and the excision filter, and there is also a design trade-off between the time-out threshold and the PLL filter bandwidth.

PLL design parameters depend on a number of system-specifics, such as sub-carrier spacing and inter-packet arrival time as well as interferer characteristics. The PLL filter bandwidth should be set to be no less than the OFDM sub-carrier spacing, as this is the quantisation of the initial, DFT-based interferer carrier frequency estimate.

Figure 4A:
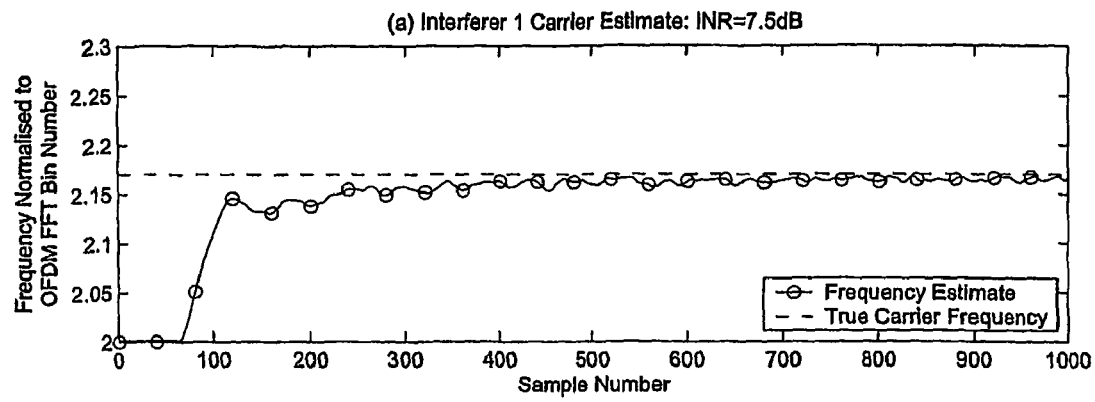
FIG. 4A shows a simulation of interferer carrier frequency estimation where the INR is 7.5 dB.
Figure 4B:
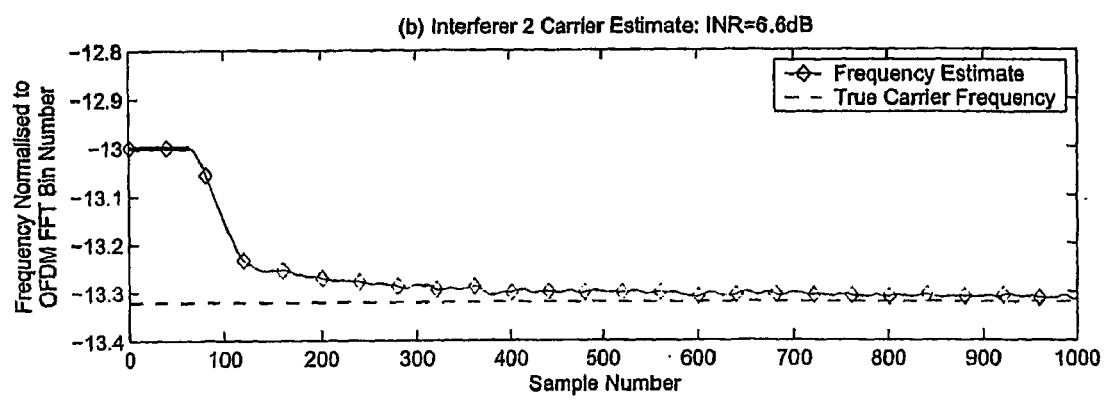
FIG. 4B shows a simulation of interferer carrier frequency estimation where the INR is 6.6 dB.
Figure 4C:
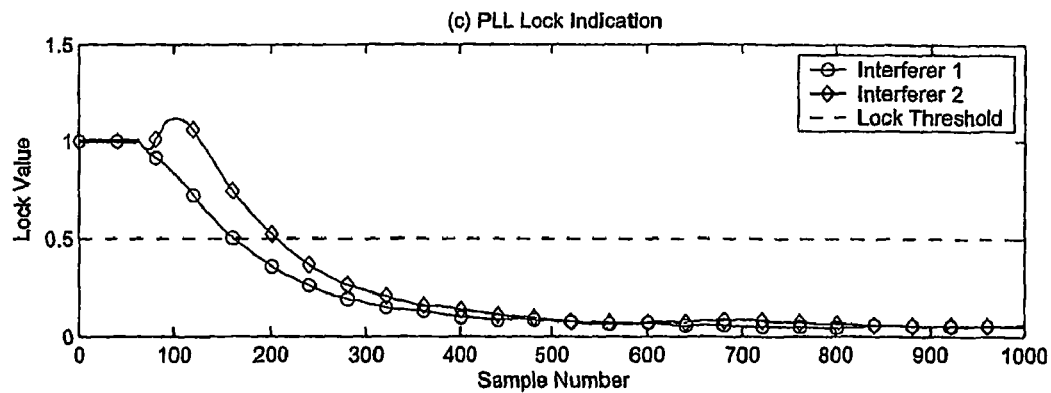
FIG. 4C shows phase lock loop indication for the interferers of FIGS. 4A and 4B.

An example of phase lock loop operation from the simulation implementation using a 5 second order digital phase lock loop with loop filter bandwidth set to 1.5 times the OFDM sub-carrier spacing is shown in FIGS. 4A to 4C. Failure of at least one PLL to achieve lock typically occurred where one interferer was of significantly lower power than the other. For example when one interferer has so low power that it could not be distinguished from background noise. In these cases the low power interferer will have 10 negligible impact on the BER. In FIGS. 4A to 4C the initial estimates are made using a 64-point DFT. These initial values are shown by heavy solid lines. FIG. 4A shows the frequency estimate for a first narrowband interferer as well as the actual interferer frequency. As can be seen the frequency estimate is close to the interferer frequency. In this Figure the interference to noise ratio is 7.5 dB. FIG. 4B shows the frequency 15 estimate for a second narrowband interferer. In this Figure the interference to noise ratio is 6.6 dB. As can be seen the frequency estimate is close to the interferer frequency. FIG. 4C shows the operation of two phase lock loops, one for each interferer. After the initial estimates subsequent estimate innovations are made using two digital phase lock loops initialised to the DFT-based estimates. A PLL 'lock' is said to have been achieved when the lock magnitude is less than 0.5-the lock values shown in FIG. 4C correspond to the estimates shown in FIGS. 4A and 4B.

Key elements of the excision filter design include the 3 dB filter bandwidth, which should be set to being equal to the OFDM sub-carrier spacing. This is a trade-off between competing requirements, first, to provide sufficient notch bandwidth to allow for estimation errors and time variation in the interferer and, secondly, to restrict notch bandwidth to minimise the impact of the excision filter(s) on data bearing sub-carriers which are unaffected by interference. An efficient implementation for multiple interferes is to design a single, high-pass, excision filter, and then to (complex) frequency-shift the received signal by each estimated interferer demodulated carrier frequency (negated) prior to filtering. The frequency response of a prototype filter is shown in FIGS. 5A and 5B and was produced using two sections of 31 taps and 21 taps, respectively, to achieve an overall impulse response equivalent to that of a 165 tap conventional FIR filter.

Figure 5A:
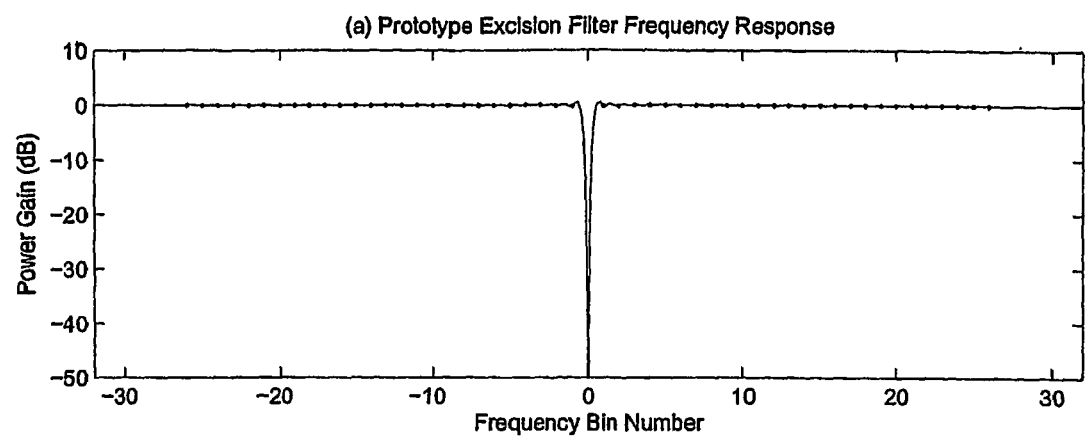
FIG. 5A shows a prototype excision filter frequency response.
Figure 5B:
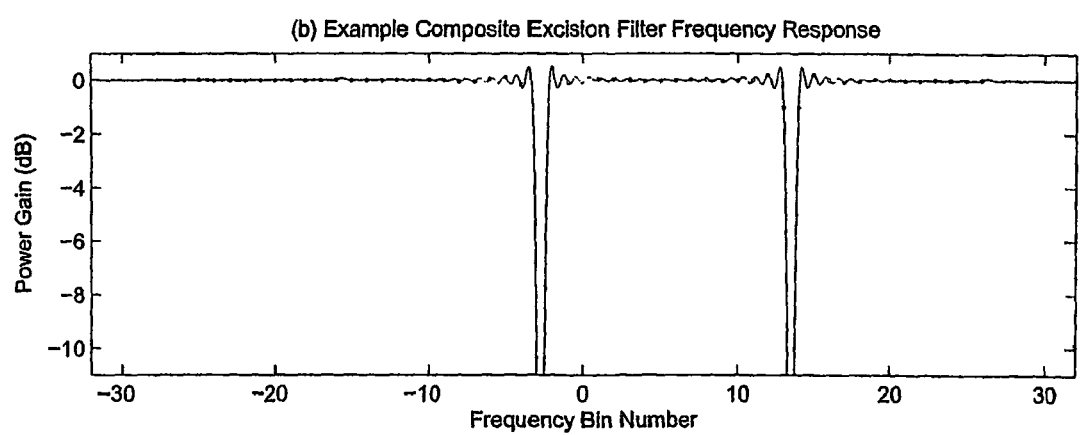
FIG. 5B shows an example of a two notch excision filter.

FIG. 5A shows a one-notch excision filter frequency response and FIG. 5B shows a two-notch excision filter frequency response. In both of these Figures the abscissa scales are normalised to the OFDM frequency bin number and the location of the OFDM data-bearing sub-carriers are indicated by heavy dots. In FIG. 5B the notch filter is designed to suppress two interferers with estimated (normalised) carrier frequencies at −2.76 and 13.5. Note that, since the overall impulse response is of greater duration than the guard intervals for IEEE 802.11a and IEEE 802.16a, some inter-symbol interference is produced. However, since a substantial majority of the impulse response power for a notch FIR filter occurs around the impulse response peak, the amount of inter-symbol interference (ISI) is small and also is deterministic. This provides a further design trade-off between excision filter effectiveness (notch depth and width) and the amount of ISI produced (which is specific to the guard interval duration of the particular OFDM system used.)

The efficacy of the proposed technique is established by computer simulation. The OFDM system simulated is baseband-equivalent to uncoded IEEE 802.11a, assuming perfect detection and synchronisation. The receiver estimated carrier frequencies for two interferers, thus two PLLs were employed. For each simulation, two narrowband interferers were approximated using stationary complex cisoids having amplitudes $\{b_1, b_2\} = U[0,1]$ such that the average signal-to-interference ratio per interferer is $$SIR = S \bigg/ \sqrt{\tfrac{1}{2}(b_1^2 + b_2^2)}$$

for RMS signal magnitude S, demodulated carrier frequencies $\{\xi_1, \xi_2\} = U[-B/2, B/2]$ for OFDM passband 3 dB bandwidth B, and phases $\{\phi_1, \phi_2\} = U[-\pi, \pi]$. For each transmitted packet, a signal-free training period of 1000 samples (50 μs for IEEE 802.11a) is provided to allow the PLLs to estimate the interferer carrier frequencies. FIGS. 4A to 4C show this number of samples is sufficient to achieve a phase lock in most cases. After 1000 samples, the excision filter is enabled in the receiver and the OFDM packet is transmitted. Each OFDM packet comprised 10,000 bits, to enable bit error rates down to $1 \times 10^{-4}$ to be measured the results presented have an error floor at $1 \times 10^{-4}$.

Figure 6A:
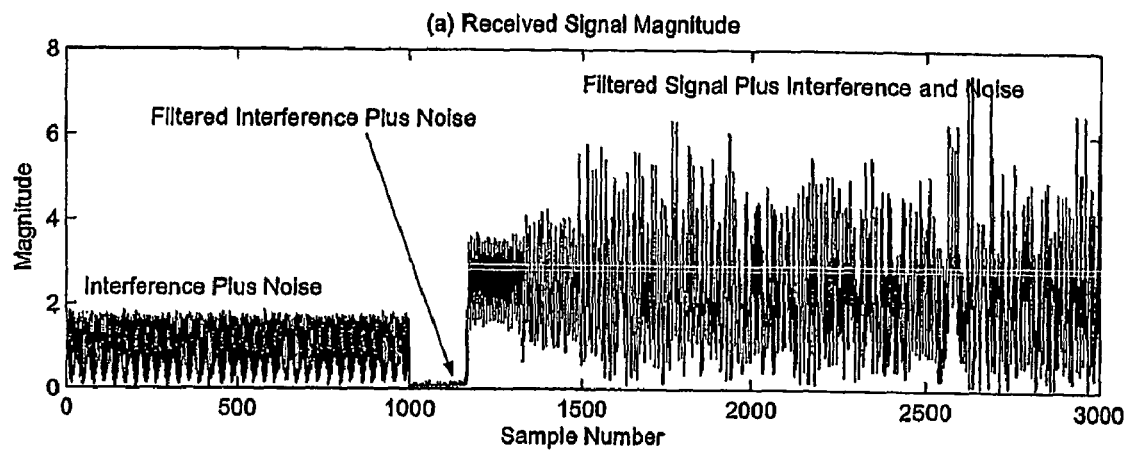
FIG. 6A shows an example of a received signal with the narrowband interference suppression system in place.
Figure 6B:
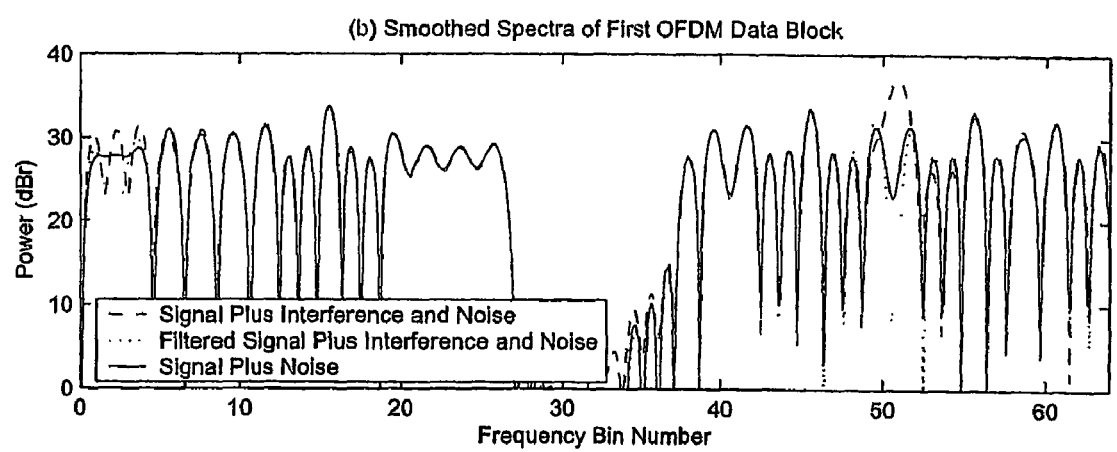
FIG. 6B shows the smoothed spectra of a first OFDM data block after narrowband interference is suppressed.

FIG. 6A shows an example received packet magnitude, truncated to 3000 samples from the start of simulation. This Figure shows the 1000 sample signal-free training period, the effect of the excision filter on the signal magnitude and the start of the OFDM packet. Two narrowband interferers are present with SIR of 10 dB and SNR of 30 dB. The interpolated spectrum of the first data block (first 64 samples after the training symbol and signal block) from the same example is shown in FIG. 6B, compared to the interference-free and unfiltered spectra for the same data block. The effect of the excision filter on the two interferers (at bin numbers 2.2 and 50.7, respectively) can be seen in this example. In FIG. 6B three spectra are shown: the dashed line shows the data symbol with noise and interference; the dotted line shows the data symbol the noise and where the narrowband interference is suppressed using the method of the invention; and the solid line shows the data symbol with noise and no narrowband interference.

Figure 7A:
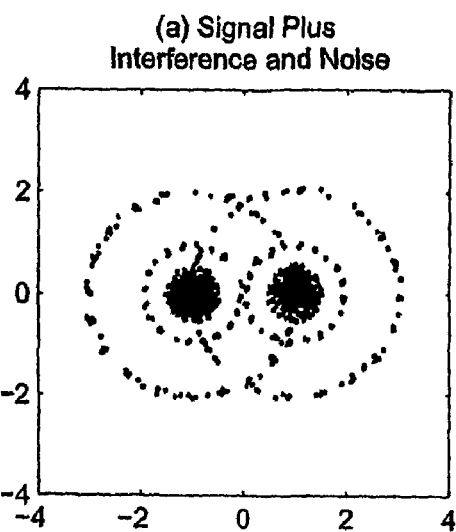
FIG. 7A shows a received signal constellation including signal, narrowband interference and noise.
Figure 7B:
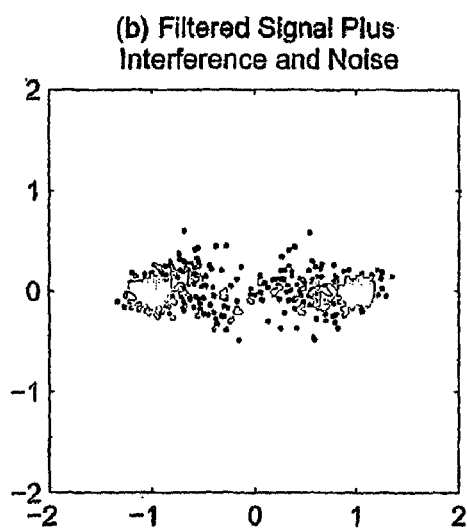
FIG. 7B shows the received signal constellation after filtering to remove narrowband interference.
Figure 7C:
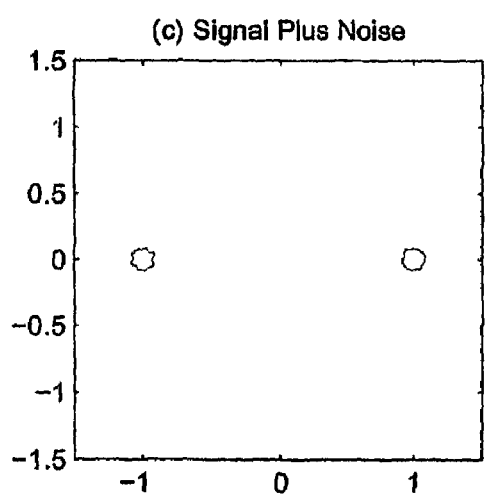
FIG. 7C shows the received signal constellation when no narrowband interference is present.

Signal constellations for a complete OFDM packet are shown in FIGS. 7A to 7C. FIG. 7A shows the signal constellation of the received signal plus interference and noise of FIG. 6A. FIG. 7B shows the signal constellation of the received signal of FIG. 6A after interference is excised using the method of the invention, and FIG. 7C shows the signal constellation of the signal of FIG. 6A when no interference is present. The effects of interference and interference suppression on this example constellation can be seen. The accuracy of the simulation BER results can be verified by comparison with analytical BER results, as shown in FIG. 1.

Figure 8A:
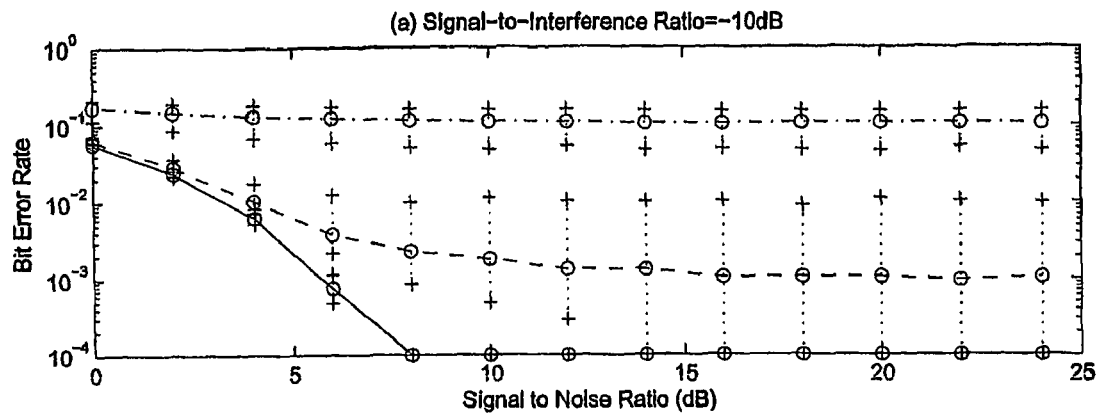
FIG. 8A is a simulation of bit error rates for BPSK modulated OFDM with two narrowband interferers and SIR of −10 dB.
Figure 8B:
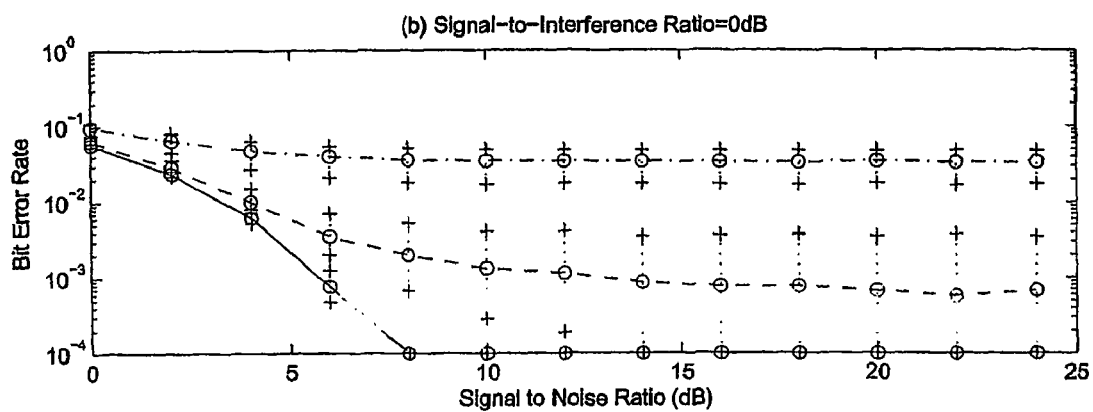
FIG. 8B is a simulation of bit error rates for BPSK modulated OFDM with two narrowband interferers and SIR of 0 dB.
Figure 8C:
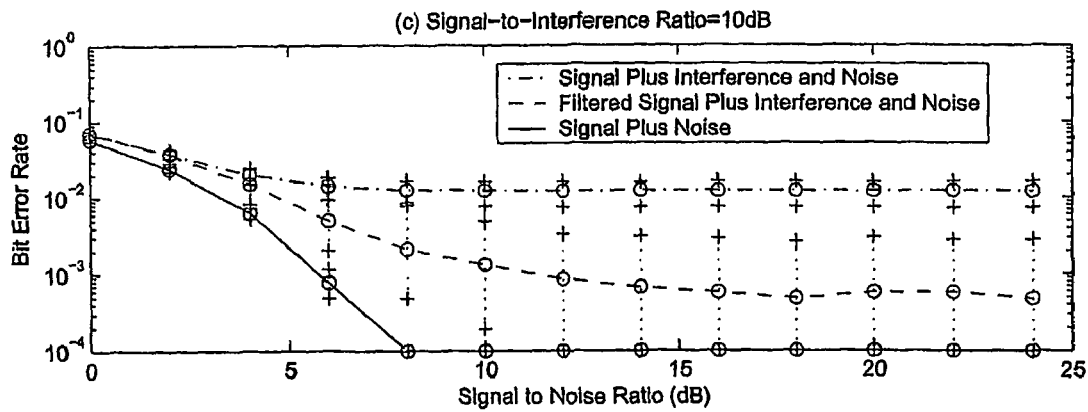
FIG. 8C is a simulation of bit error rates for BPSK modulated OFDM with two narrowband interferers and SIR of 10 dB.

Bit error rate curves were produced by simulation, where each point on a curve is the median of 1000 simulations. This allows the effect of variation within the ensemble of interferer relative amplitudes, carrier frequencies and carrier phases to be indicated by error bars on the $10^{th}$ and $90^{th}$ percentiles. FIGS. 8A to 8C show mean bit error rate curves for signal-to-interference ratios of −10 dB, 0 dB and 10 dB respectively for the same OFDM packets with two unsuppressed narrowband interferes, with excised interferers, and with no interferers. The interferer-free curves closely follow those for conventional BPSK in AWGN.

FIG. 8A shows simulation rates of BPSK modulated OFDM with two narrowband interferes and SIR of 10 dB. The dashed-dotted line shows the signal plus interference and noise, the dashed line shows the filtered signal plus interference and noise where the interference has been excised using the method of the invention and the solid line shows the signal with no narrowband interference. The error bars show the $10^{th}$ and $90^{th}$ percentiles of the BER over the ensemble interferer relative powers, carrier frequencies, carrier phases and AWGN. The same legend applies to FIGS. 8B and 8C. It can be seen from FIGS. 8A to 8C that the effects of narrowband interference are severe. Interference excision can be seen to significantly improve the bit error rate for an SIR of −10 dB, by reducing the median "error floor" from greater than $1 \times 10^{-1}$ to about $1 \times 10^{-3}$. However, the variation within the ensemble also can be seen to be greater for the interference excision results. This is due to two factors: firstly, the number of data bits per OFDM block affected by excision depends heavily on the particular values of interferer carrier frequency and, secondly, at least one PLL failed to "lock" for at least 15% of all simulations thus increasing the variability of BER results.

Close inspection of FIGS. 8A to 8C reveal that, at low SNRs, the median excised interferer curves are closer to the interferer-free curves at low SIR (FIG. 8A) than at high SIR (FIG. 8C) whereas, at high SNRs, the opposite is true. This highlights that the performance-limiting mechanisms are different at low SNR than at high SNR. At low SNR, excision filter performance is limited by the accuracy of the interferer carrier frequency estimates. At high SNR, excision filter performance is limited by finite precision arithmetic effects in the filter itself. Note that the excision filters employed in these simulations introduce some ISI. It can be shown analytically, and is evident empirically, that the impact of this ISI on BER is negligible in comparison to the primary performance-limiting mechanisms discussed above for the implementation described previously.

Figure 9A:
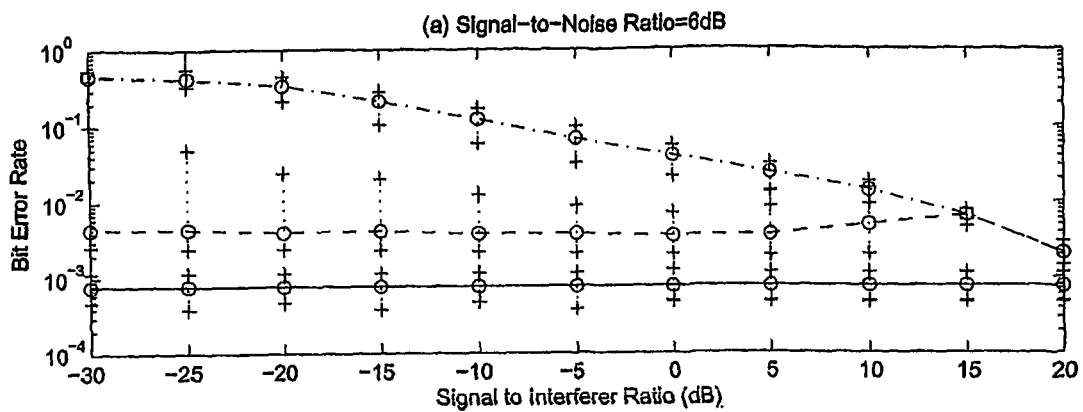
FIG. 9A is a simulation of bit error rates for BPSK modulated OFDM with two narrowband interferers and SNR of 6 dB.
Figure 9B:
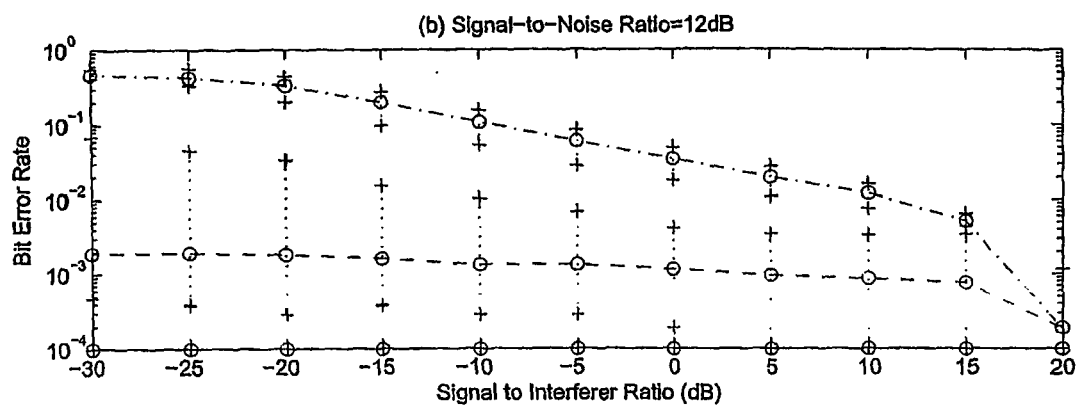
FIG. 9B is a simulation of bit error rates for BPSK modulated OFDM with two narrowband interferers and SNR of 12 dB.
Figure 9C:
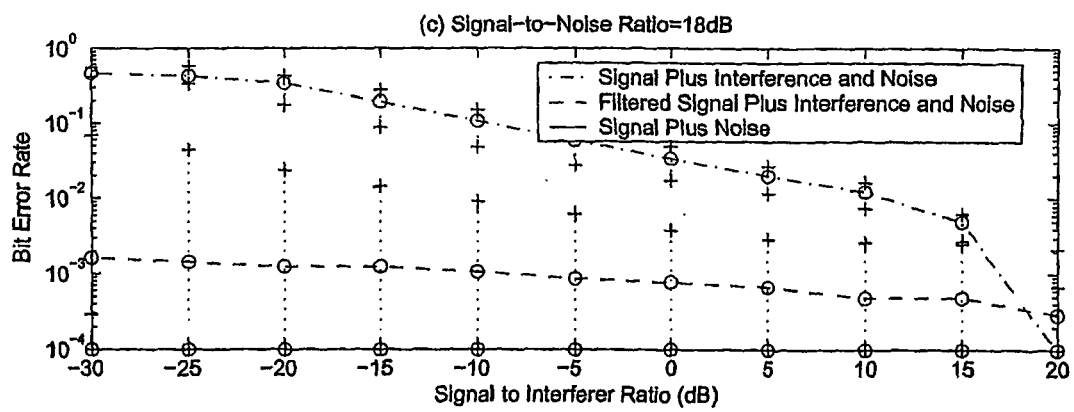
FIG. 9C is a simulation of bit error rates for BPSK modulated OFDM with two narrowband interferers and SNR of 18 dB.

Interference excision was found to be effective across a wide range of SIRS, as shown in FIGS. 9A to 9C. FIGS. 9A to 9C show bit error rates for BPSK modulated OFDM with two narrowband interferers. Each of the Figures shows three curves being the ensemble median BERs for the same data packets where: the dashed-dotted line represents signal plus noise and narrowband interference; the dashed line represents the signal plus noise where the narrowband interference has been excised using the method of the invention; and the solid line represents the signal plus noise where no narrowband interference is present. These Figures show that OFDM systems employing interference excision as described here exhibit acceptable uncoded median BERs of about $1\times10^{-3}$ for SIRs down to −30 dB. However it should be noted also that the variation within the ensemble increases as the SIR decreases indicating that for some particular values of $\xi T$ and $\phi$, interference excision is more likely to leave a packet severely errored as the SIR decreases. FIGS. 9A to 9C also show that the interference excision ceases to improve BER performance when the SIR exceeds about 15 dB. This effect occurs at an SIR of about 15 dB for three reasons: first, narrowband interference causes increasingly fewer bit errors at higher SIRs, secondly, at a given SIR (for lower SNRs), the low INR makes interferer carrier frequency estimation less reliable and, thirdly, the number of bit errors introduced by the excision filter begin, as SIRs increase, to exceed the number produced by narrowband interference. For low, SIRs, these performance limitations in the interference suppression system are outweighed by the impact of unsuppressed narrowband interference on BER performance which otherwise would make any reliable communications unreliable.

Figure 10A:
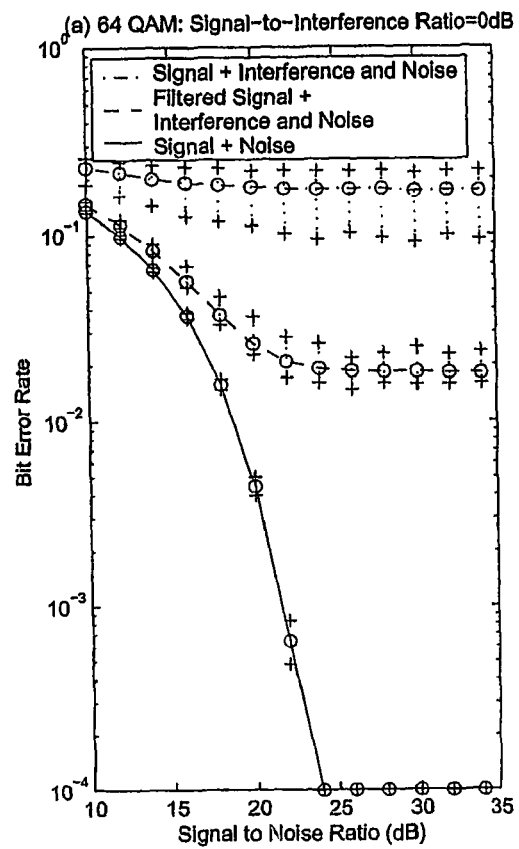
FIG. 10A is a simulation of bit error rates for 64-QAM modulated OFDM with two narrowband interferers and SIR of 0 dB.
Figure 10B:
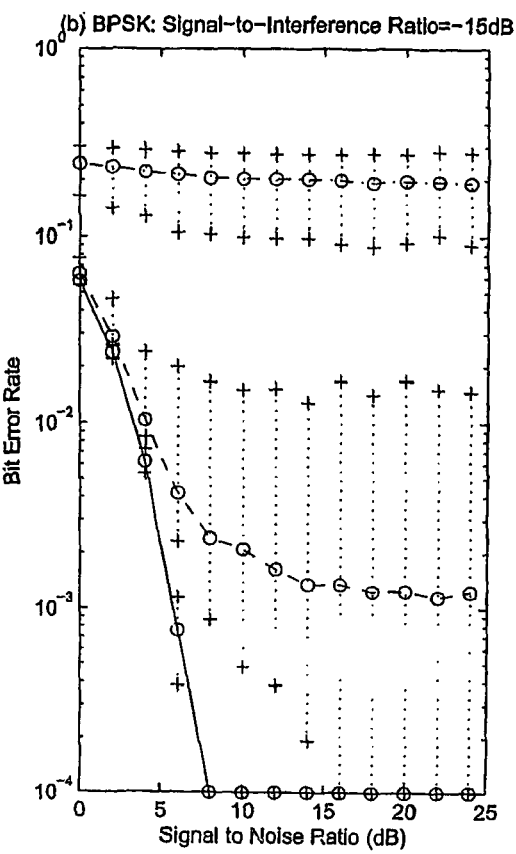
FIG. 10B is a simulation of bit error rates for BPSK modulated OFDM with two narrowband interferers and SIR of −15 dB.

A limitation of interference excision is that it provides less benefit with QAM modulations in comparison with pure phase modulations. FIGS. 10A and 10B show BER curves for 64-QAM and BPSK modulated OFDM respectively, where the SIR and SNR have been selected so that the interferer plus noise and interferer-free results are similar between systems. FIGS. 10A and 10B each include three curves. The dash-dotted curve represents the data packet plus noise and narrowband interference, the dashed line represents signal plus noise where the interference has been excised using the method of the invention, and the solid line represents signal plus noise where no narrowband interference is present. It can be seen that interference excision provides about one order of magnitude less benefit in BER improvement for the 64 QAM system in comparison with the BPSK system. This is due to the excision filter attenuating (or amplifying) to some extent several OFDM data bins around each interferer. This causes few bit errors in BPSK modulated OFDM as phase modulations are robust to amplitude variations. However, QAM systems are very sensitive to amplitude variations, particularly for large constellations, as signal amplitude is part of the data representation. Although this effect could be mitigated somewhat by equalization, use of a more robust modulation seems prudent in an interference-limited environment in any case, as the impact of narrowband interference on QAM modulated OFDM also is more severe than on BPSK modulated OFDM.

An interference suppression technique of the invention based on excision filtering has been described and shown by computer simulation to produce a significant improvement in the bit error rate of BPSK modulated OFDM compared to no interference suppression. Using this technique, which works within existing OFDM-based standards, it has been shown that acceptable ensemble bit error rates of about $1\times10^{-3}$ are obtainable for signal-to-interference ratios as low as −30 dB. Excision filtering is effective for OFDM, because it significantly reduces the major error-producing effect—spectral leakage—by filtering the interference before the discrete Fourier transform. The interference suppression technique of the invention has particular application for the data transport phase of receiver operation rather than the detection and synchronisation phase (although it can be used during packet detection and synchronisation). The technique of the invention can be used in combination with a technique for narrowband interference detection and suppression during the detection and synchronisation phases of data reception.

The foregoing describes the invention including preferred forms thereof. Alterations and modifications as will be obvious to those skilled in the art are intended to be incorporated in the scope herein as defined in the accompanying claims.

The invention claimed is:

1. A method of suppressing narrowband interference in OFDM receivers comprising the steps of:
   acquiring samples of received data;
   estimating parameters of each of a number of narrowband interferers from the acquired samples of received data;
   forming an excision filter using the estimated parameters; and
   inserting the excision filter into an OFDM receiver.

2. A method of suppressing narrowband interference in OFDM receivers as claimed in claim 1, wherein the estimated parameters of the narrowband interferers include demodulated carrier frequency, magnitude and phase.

3. A method of suppressing narrowband interference in OFDM receivers as claimed in claim 2, wherein the step of estimating parameters of each of the number of narrowband interferers comprises the steps of:
   performing a forward DFT on the samples to produce an output; and
   performing a periodogram search on the output of the DFT to identify peaks in a periodogram where the number of peaks in the periodogram corresponds to the number of narrowband interferers.

4. A method of suppressing narrowband interference in OFDM receivers as claimed in claim 3, wherein the step of estimating parameters of each of the number of narrowband interferers comprises the steps of:
   estimating frequency, amplitude and phase of each of the number of peaks in the periodogram;
   estimating the demodulated carrier frequency of a narrowband interferer as the frequency of a peak on the periodogram;
   estimating the magnitude of the narrowband interferer as the amplitude of a corresponding periodogram peak; and
   estimating the phase of the narrowband interferer as the phase of the corresponding periodogram peak.

5. A method of suppressing narrowband interference in OFDM receivers as claimed in claim 1 further comprising the step of initialising one digital phase lock loop for each estimated narrowband interferer using the narrowband interferer parameter estimates.

6. A method of suppressing narrowband interference in OFDM receivers as claimed in claim 5 further comprising the step of updating each digital phase lock loop for each incoming sample until either a counter expires or an OFDM packet is detected.

7. A method of suppressing narrowband interference in OFDM receivers as claimed in claim 5 further comprising the step of initialising the excision filter with current narrowband interferer carrier frequency estimates from each digital phase lock loop that has achieved lock when an OFDM packet is detected.

8. A method of suppressing narrowband interference in OFDM receivers as claimed in claim 1 further comprising the step of receiving an indication of a start of packet when a data packet is received by the OFDM receiver.

9. An OFDM receiver comprising:
a front end arranged to receive data;
a data sampler arranged to provide samples of the received data;
a narrowband interference detector that detects narrowband interferers in the samples of the received data and estimates parameters of each narrowband interferer; and
an excision filter that uses the estimated parameters of each narrowband interferer to reduce noise from the narrowband interferers wherein the excision filter is inserted in the OFDM receiver prior to a Fourier transform operator.

10. An OFDM receiver as claimed in claim 9, wherein the narrowband interference detector estimates the demodulated carrier frequency, magnitude and phase of the narrowband interferers.

11. An OFDM receiver as claimed in claim 9, wherein the Fourier transform operator is arranged to perform a Fourier transform on the samples and perform a periodogram search on the output of the Fourier transform operator to identify peaks in a periodogram and the narrowband interference detector further comprises at least one phase lock loop arranged to lock onto a peak identified by the periodogram search.

12. An OFDM receiver as claimed in claim 11, wherein the narrowband interference detector is arranged to estimate frequency, amplitude and phase of each of a number of peaks in the periodogram, estimate the frequency of an interferer as the frequency of a peak on the corresponding periodogram, estimate the magnitude of the interferer as the amplitude of the corresponding periodogram peak, and estimate the phase of the interferer as the phase of the corresponding periodogram peak.

13. An OFDM receiver as claimed in claim 11, wherein the narrowband interference detector includes a timer and a filter design module.

14. An OFDM receiver as claimed in claim 13, wherein the OFDM receiver further comprises a pilot symbol detector to provide an estimate of the start of an OFDM data packet to the narrowband interference detector.

15. An OFDM receiver as claimed in claim 14, wherein the narrowband interference detector is arranged to innovate the at least one phase lock loop until either the timer times out or the OFDM data packet is received.

16. An OFDM receiver as claimed in claim 15, wherein the at least one phase lock loop is arranged to estimate the carrier frequency of the narrowband interferers.

17. An OFDM receiver as claimed in claim 16, wherein one phase lock loop is used for each interferer.

18. An OFDM receiver as claimed in claim 16, wherein current narrowband interferer carrier frequency estimates from each phase lock loop that has achieved lock are used by a filter estimator to initialise the excision filter when the OFDM data packet is detected.

19. An OFDM receiver as claimed in claim 9, wherein the excision filter has impulse response duration less than an OFDM guard interval.

* * * * *